Sept. 6, 1932.  J. HARTNESS  1,875,726
THREAD GAUGE
Filed April 7, 1927   3 Sheets-Sheet 1
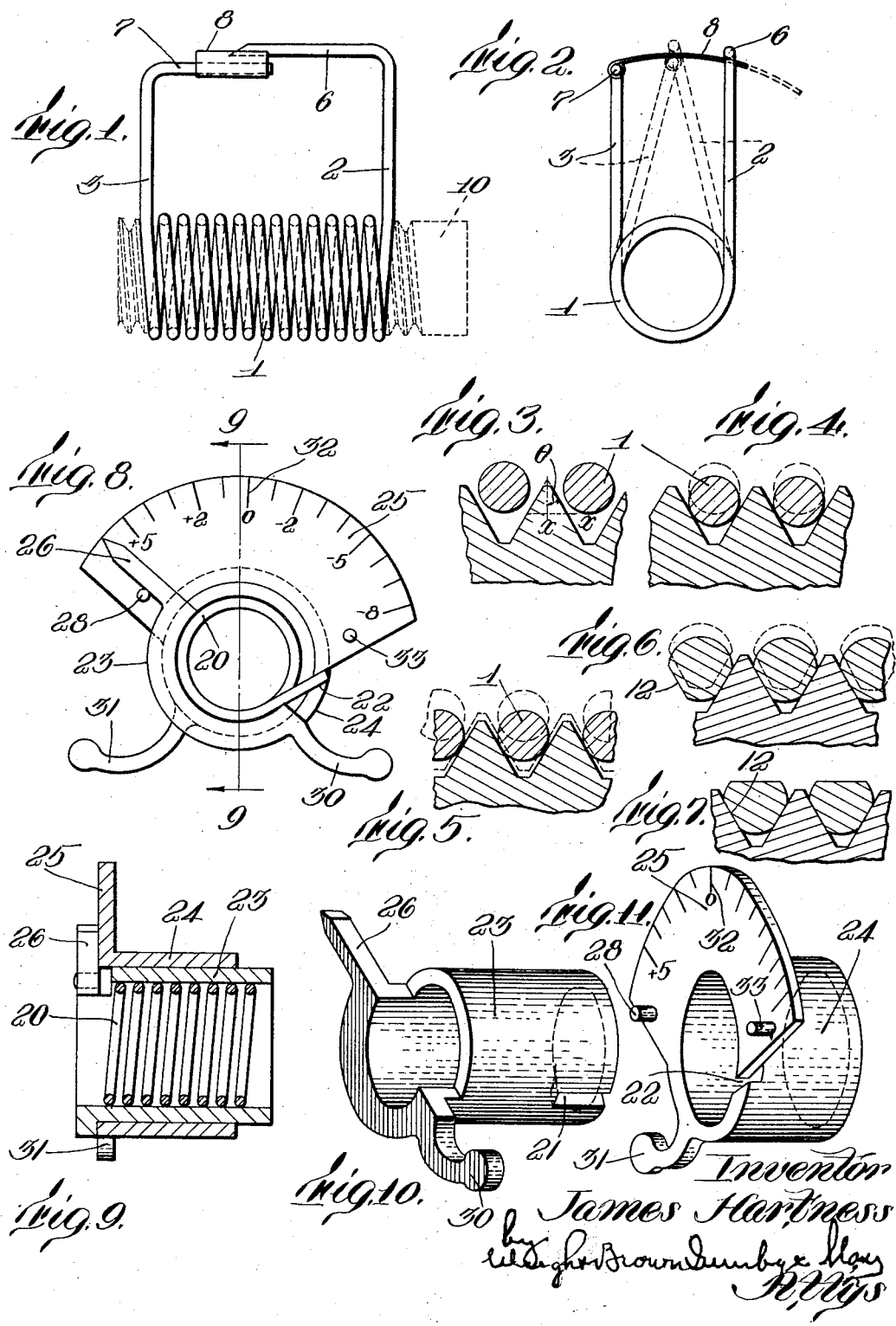

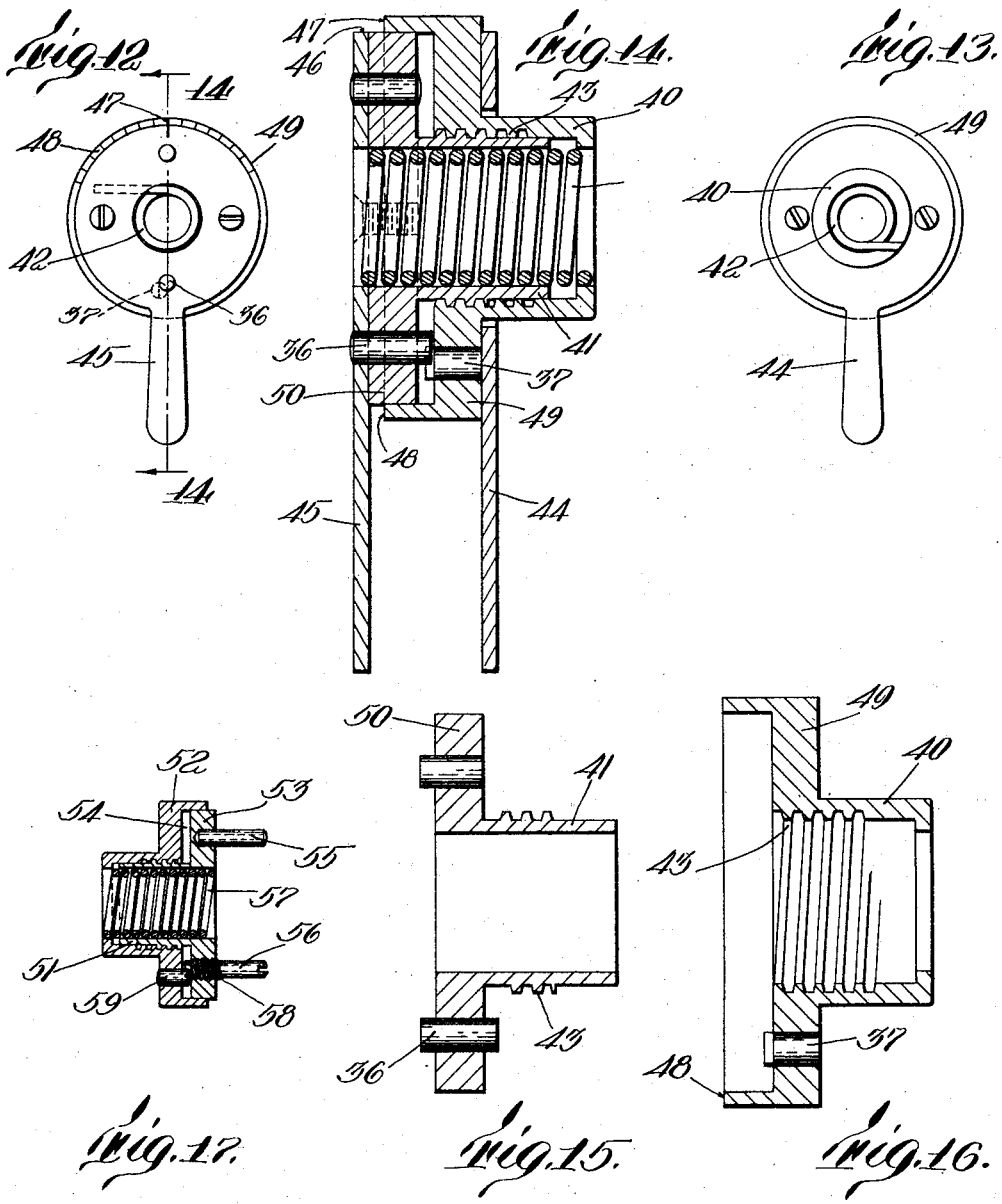

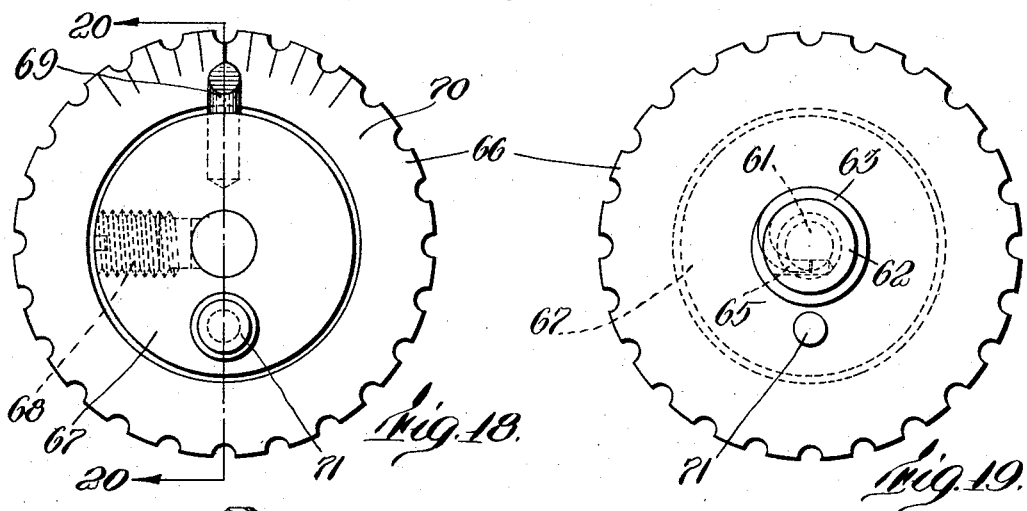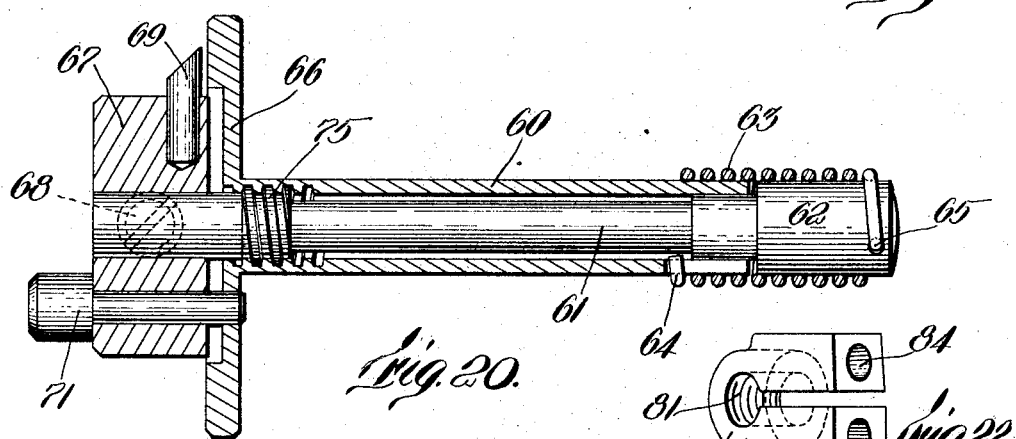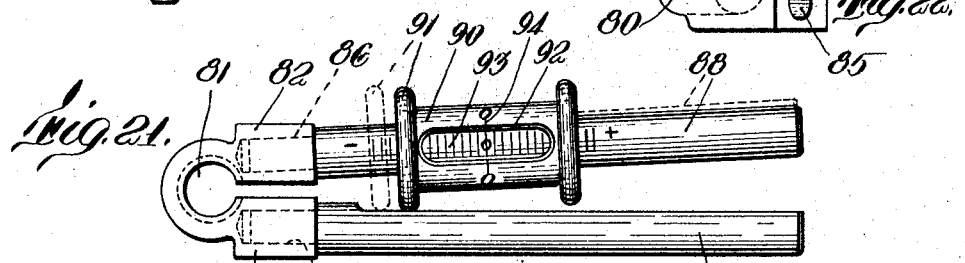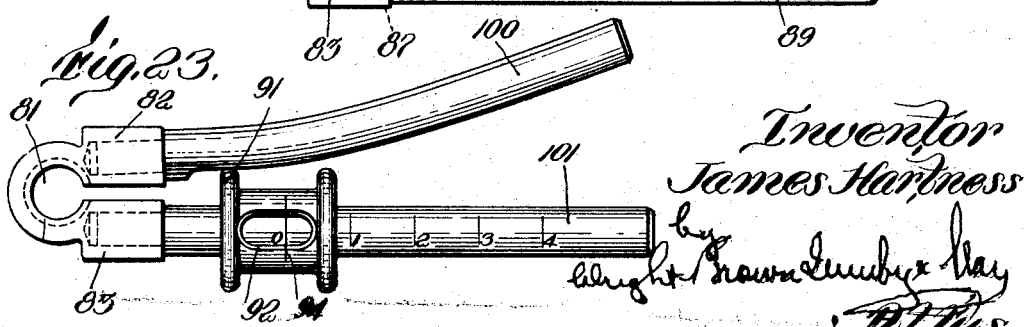

Patented Sept. 6, 1932

1,875,726

UNITED STATES PATENT OFFICE

JAMES HARTNESS, OF SPRINGFIELD, VERMONT

THREAD GAUGE

Application filed April 7, 1927. Serial No. 181,708.

One of the most important phases of standardization of screw thread products is that of interchangeability, so that the products made in different parts of a manufacturing plant, or different manufacturing plants at a distance from each other may be assembled without difficulty and in a dependable manner.

In order that such interchangeability may be secured it is necessary that several elements be taken into account, none of which may be varied beyond predetermined limits for a certain class of fit.

Important among those elements is the effective engaging diameter of the threads, which may be conveniently expressed in terms of pitch diameter, for with a known pitch diameter one can compute the thickness of thread at the pitch line.

Heretofore the suitability of threaded parts for interchangeability within a given class of fit has been tested by the use of various forms of gauges termed "Go" and "Not go." If the threaded member is acceptable by the "Go" gauge and is not acceptable by the "Not go" gauge it has been passed as sufficiently accurate. This condition, however, does not necessarily signify that each of the various elements, for which there are tolerance limits, is actually within such limits since variation in one may to a greater or less extent offset variation in another. For example, an excessively long or short lead in a screw will give an effect of increased pitch diameter in the closeness of engagement of the screw in a standard nut, or in some types of "Go gauge."

The present invention has to do with the testing of the effective engaging diameters, or as hereinbefore noted, the pitch diameters, and particularly with a comparison of pitch diameters of threads to be tested with those of standard threads, and by which variations above and below that of the corresponding standard may be recognized.

Further, according to this invention means are provided by which the actual variations of pitch diameter are magnified so that they are more readily ascertainable. One form of magnification common to all the various gauge constructions, hereinafter more particularly described, is produced through the use of a flexible element which may be wrapped about the thread approximately at its pitch diameter, and on the corresponding portion of the standard thread and the thread to be tested, so that variations in diameter result in variations in circumference as shown by the extent of wrapping of a given length of the element; that is, to multiply the amount of pitch diameter variations by the quantity $\pi$ (3.14159). This multiplication may be further extended, certain of the gauges hereinafter described producing such extended multiplication by the use of a multiplicity of convolutions of the wrapping element. Other methods may also be employed as will later appear.

While measurement of pitch diameter of external threads has heretofore been obtained by placing a wire of precisely the proper dimensions between successive threads, and then calipering across the exposed faces of the wire on opposite sides of the thread axis, this method is subject to the disadvantage of requiring the utmost accuracy of wire size and skillful manipulation of the calipers. No such difficulties are encountered with the present method, zero or "null" position of the gauge being determined by the position of the size indicator when the gauge is applied to a standard thread, the gauge showing the variation of threads to be tested by the extent of departure of the indicator in either direction from the zero or "null" position when the gauge is applied to such threads. The size and shape of the wrapping element may thus be any convenient one within a considerable range.

The wire and caliper method has been found convenient for measuring precision screws for use as standards and as a laboratory method. It is unsuitable for measuring screws having uneven thread surface as delivered from a screw machine, since besides the disadvantage of requiring accuracy in wire size and skillful manipulation of the calipers, it measures only at individual points of contact which may not be the average for the screw.

The present gauge, however, engages the thread surface with a wire coiled into a helix a trifle larger than the largest screw to be measured which is an exceedingly satisfactory means for measuring the effective pitch diameters or thickness of the thread flanks, first, because it gives a line contact for its entire length, second, because it lends itself to a quick opening and shutting so that it may be quickly applied and removed from the threaded member, and third, because it lends itself to magnification in its reading, since a difference of .001 of an inch in pitch diameter is multiplied first by the quantity $\pi$ since it is changed from diameter to circumference, and then, if more than one turn of wrapping element is employed, by the number of turns, and then by the increased radius of the pointer at the dial over that of the wrapping element radius closed on the work.

As the engagement of the gauge on the threads is over an extended area, no material variations in indicator reading are produced solely by usual variations in manipulating pressure, so that this personal equation as a factor in effecting the indication becomes negligible.

As will more fully appear also the principles of this invention are applicable to the gauging of internal as well as external threads.

For a more complete understanding of this invention reference may be had to the accompanying drawings in which Figures 1 and 2 are front and end elevations of one form of gauge embodying this invention.

Figures 3 and 4 are diagrammatic views illustrating the action of the gauge when applied to standard external threads.

Figure 5 is a diagrammatic view showing the action of the gauge when applied to threads other than standard.

Figures 6 and 7 are diagrammatic views illustrating wrapping elements or wires of different cross section from those shown in Figures 4 and 5.

Figure 8 is an elevation showing a modified gauge construction.

Figure 9 is a section on line 9—9 of Figure 8.

Figures 10 and 11 are detailed perspectives of parts of the construction illustrated in Figures 8 and 9.

Figures 12 and 13 are elevations of a different form of gauge.

Figure 14 is an enlarged section on line 14—14 of Figure 12.

Figures 15 and 16 are sections through certain members of the construction shown in Figures 12, 13 and 14 in detached condition.

Figure 17 is a view somewhat similar to Figure 14, but showing a still further modification.

Figures 18 and 19 are elevations of a gauge for testing pitch diameters of internal threads.

Figure 20 is a section on line 20—20 of Figure 18.

Figure 21 is an elevation of an external pitch thread diameter testing gauge of a quite different construction from those shown in Figures 1 and 8 to 11.

Figure 22 is a detail in perspective of one member of the gauge shown in Figure 21.

Figure 23 is a view similar to Figure 1, but showing a modification to present a uniform scale.

Referring first to Figures 1 and 2, which show a simple form of external thread gauge to illustrate the principles involved, 1 indicates a coil of wire having its ends 2 and 3 extending outwardly along tangential lines from the body of the coil then turned in parallel relation as at 6 and 7. The end 7, which is shown as extending beneath the end 6, may have secured thereto a scale plate 8 over which the end 6 may ride as the coil 1 is tightened or allowed to spring open. When the coil is in its normally open position an externally threaded member such as the standard screw plug is inserted as shown at 10 within the convolutions of the coil 1 and the portions 2 and 3 are then turned relative to each other in the direction to tighten the coil so that the convolutions thereof are brought down upon and engage between the threads of the screw. This causes the end 6 to move over the scale plate 8 to a definite position thereon when the coil is closed onto the standard screw. If now the coil be allowed to open and the standard screw be removed and replaced by the screw to be tested and the coil be then closed on the threads of this screw in the same manner as on the standard screw, the end 6 may take a different position on the scale 8, depending on the relative average pitch sizes of the standard screw and the screw to be tested. If the screw to be tested is larger than the standard screw, the arm 6 will not move so far across the scale 8 as the coil is tightened on the threads. If the pitch diameter of the screw to be tested is smaller than the standard screw, the end 6 will move further along the scale since it requires more closing of the coils to bring them into contact with the threads.

Difference of pitch diameter, of course, produces corresponding difference in circumferential length of the pitch line for a given number of convolutions multiplied by the quantity π for each complete convolution. As there are a plurality of convolutions of the coil 1 about the threads pitch diameter differences are further multiplied by this number. This difference is still further multiplied by the ratio of the lever arm of the end 2 to the raduis of the coil as tightened about the threads to give a magnified indication. Very small differences in pitch diameter will thus be evidenced by considerable differences in the position of the end 6 with relation to the scale 8 when the coil is tightened. Furthermore, it will be seen that the coil 1 engages over a very considerable length of threads and substantially at the pitch diameter, thus giving an average indication of the pitch diameter throughout the entire length of contact, the engagement being substantially a line contact on the threads in substantially the position where the maximum stresses are applied when the screw is in service.

It is not necessary that the coil 1 be of wire of any particular size, since it is quite unnecessary that it engage exactly along the pitch line, the measurement being not the actual diameter of the coil as closed on the threads, but the difference between the position of the ends of the wire when the coil is closed on a standard threaded piece and when closed on a threaded piece to be tested.

This indication, which for convenience may be taken as pitch diameter, is a measure of the strength of the threads in service as it is an indication of the thickness of the thread flanks, taken for convenience at the pitch diameter. For example, as will be seen by a reference to Figure 3, a change of radius of the pitch line represents a change of thickness of the flank at that line of twice the tangent of the angle which the thread face makes with a line radial to the screw (angle θ). As this angle is normally 30°, the line x—x representing one half of the thickness of the tooth at the pitch diameter varies in length with variations in the radius at the pitch line by the tangent of 30° or .577, but as the diameter is twice the radius the total thickness variations of the thread flanks at the pitch line are .577 times the variations of pitch diameter.

Figure 3 shows diagrammatically the relation of the threads to the coil 1 when the threaded member is placed in position therein and Figure 4 shows the coil in full lines as tightened down between the threads. If desired the wire may be so shaped as to engage the thread faces over a band of substantial width. For this purpose the wire may be of the modified cross sections, as shown for example in Figures 6 and 7, presenting substantially flattened faces 12 for engagement with the thread faces.

Figure 5 illustrates the manner in which the convolutions of the coil 1 are brought down between the threads to different extents, depending on differences of pitch diameter, the full line screw outline representing a screw of less than standard pitch diameter, the standard being shown by dotted thread outline.

In order to construct the gauge in a form better suited for handling, the wire ends 2 and 3 may be omitted and more rigid elements substituted therefor. One construction suitable for the purpose is shown in Figures 8 to 11. Referring to this construction it will be seen that opposite ends of the coil spring 20 are fixed in notches 21 and 22 in a pair of sleeves 23 and 24, the sleeve 23 being rotatable within the sleeve 24. The sleeve 24 is provided with an arcuate graduated index plate 25 over which moves a pointer 26 carried by the sleeve 23. The spring 20 of its own resiliency tends to open against the inner wall of the sleeve 23 and tends to hold the pointer 26 in contact with a stop pin 28 on the index plate 25. The members 23 and 24 may be provided with finger levers 30 and 31, respectively, which when the screw to be tested has been inserted within the convolution 20 may be brought together thus to tighten the spring 20 on the threads of the piece to be tested. Conveniently the scale 25 may have indicated thereon a zero point at 32 corresponding to the position of the pointer 26 thereon when the spring 20 has been closed onto the threads of a standard screw. Variations in either direction from this zero point when the spring is closed on the threads of a member to be tested will give an indication of departures of pitch diameter and consequent flank thickness of the piece to be tested from the standard. For convenience the scale 25 may be calibrated to read in pitch diameter, indications between the zero point and the pin 28 indicating plus variations in pitch diameter and on the opposite side of the zero point minus variations, that is, if the pitch diameter of the test piece is larger than standard, the pointer 26 can not be moved to zero and remains on the positive part of the scale, while if it is less than standard the pointer can be moved past the zero to the negative part of the scale. A pin 33 may also extend from the scale plate 25 to limit the closing of the spring so that the spring may not be closed to such an extent as to injure it. The range permitted the pointer 26 should, however, be sufficient to show the entire tolerance range for the size of screw being tested.

In Figures 12 to 16 is shown a slightly modified construction in which the sleeve members 40 and 41 to which the ends of the coil spring 42 are attached have threaded engagement with each other by threads 43 of a lead equal to the lead of the threads on which the gauge is to be used. This causes a longitudinally relative movement between the sleeves 40 and 42 corresponding to the lengthening or shortening of the coil 42 as it is wound to engage about more or less axial length of the threads engaged thereby, depending on the engaging diameters of such threads. This causes the coil ends to be moved in their proper relations to each other to follow standard threads, thus avoiding distortion of the coil member in directions other than that required to close its convolution on the work.

Each of the sleeves 40 and 41 may be provided with a handle portion as 44 and 45 by which the sleeves may be held and turned relatively when the spring is tightened up on the threaded member and a suitable scale for indicating the relative angular position of these sleeves may be employed. For example, the sleeve 41 may be provided with an indicator or pointer as at 46 which may be related to a scale 47 on the edge 48 of a portion 49 of enlarged diameter at one end of the sleeve 40 and within which a similarly enlarged portion 50 of the sleeve 41 rides. Cooperating stop pins 36 and 37 may be used to limit the opening and closing movements of the sleeves 40 and 41.

In Figure 17 a further modification has been shown in which, instead of handles 44 and 45, the inner sleeve member 51, threaded in the outer sleeve member 52 by threads of a lead equal to that of the threads which the gauge is intended to test, is provided with a portion 53 of enlarged diameter fitting within a socket portion 54 of the outer member 52. This portion 51 is provided with a pair of pins 55 and 56 which may be engaged by the operator to turn the inner sleeve relative to the outer, thus to close the spring 57 onto the work. One of the pins as 56 may be extended as at 58 to engage a stop pin 59 projecting from the outer member 52, this defining the opening and closing limits of the gauge.

This general type of gauge, however, is not limited to the measurement of external threads, and in Figures 18 to 20 a construction is shown particularly designed for the measurement of internal threads. Referring to these Figures, 60 indicates a sleeve having journaled therein a stem 61. One end of this stem is provided with a head 62, the outer face of which is of the same diameter as that of the outer face of the sleeve 60. A coil spring 63 is wound about the adjacent portions of the sleeve 60 and the head 62, one end being fixed to the sleeve as at 64 and one end to the head as at 65. This spring is of a normal internal diameter greater than the external diameters of the head 62 and the sleeve 60, but it may be tightened down to the smaller diameter by effecting relative rotation between the head 65 and the sleeve 60 in a direction to wind the spring thereon. The opposite end of the sleeve 60 is formed with a flange or disk member 66 and adjacent to the end of the stem 61 has fixed thereto a cylindrical head 67. As shown this head is fixed to the stem by means of a set screw 68 and carries an indexing pointer 69 which rides over the graduated outer face 70 of the portion 66. Preferably the sleeve 60 and the stem 61 have threaded engagement as at 75 by threads of the same lead as the standard screw of the size the gauge is intended to measure so that the ends of spring 63 are caused to be moved relatively axially as they are rotated so that the coils of the spring are maintained the proper distance apart. The member 67 may be fixed against rotation relative to the disk 66 with the spring 63 tightened onto the sleeve 60 and the head 62 by any suitable means such as the removable headed pin 71. When this gauge is to be used the cylindrical member 67 is turned relative to the disk 66 in a direction to wind up the spring 63 thereon, whereupon the pin 71 is placed in position to hold the parts in this condition. It is then screwed into the internally threaded member and, the pin 71 being removed, the spring 63 is permitted to uncoil until its convolutions engage between the internal threads of the member to be tested. This causes a relative rotation between the block 67 and 66, the extent of which is indicated by the position of the pointer 69 with reference to the scale 70, a zero or null position on the scale to be indicated where the pointer stops when the spring 63 is in engagement with the threads of a standard internally threaded piece, variations of the pointer 69 from this zero or null position when the spring 63 is in engagement with a piece to be tested indicating comparatively the pitch diameter of the test piece relative to the standard. It will be noted that in this construction the spring is wound to its smaller diameter before being inserted in the threaded opening and is allowed to expand into contact therewith, while in the case of the external gauge the spring is in its unwound condition and is tightened up by force applied thereto to close it against work to be tested. By causing the force applied to the spring in all cases to tend to close it, danger of distortion of the spring by the forces applied thereto in service is minimized. In all the constructions heretofore described, a plurality of convolutions of the spring member for engagement between the threads of the pieces to be tested are employed and it is evident that with such a construction the threads to be tested must be as long as the spring coil which is brought into engagement therewith.

In Figures 21 to 23 is shown a construction where somewhat less than a single convolution is employed, the magnification of pitch diameter differences being produced by other means. Referring to these figures, 80 indicates a spring jaw internally threaded as at 81 which may be closed down upon an externally threaded member. In its normal condition the end portions 82 and 83 of this member are sprung somewhat apart and the threaded opening 81 is sufficiently above basic to permit the insertion therein of any screw having a pitch diameter within the tolerance limits for the particular size screw intended to be tested by this gauge. The end portions 82 and 83 have sockets 84 and 85 in which are fixed the reduced extremities 86 and 87 of a pair of rods or handles 88 and 89. One of these rods, as 88, has slidably mounted thereon a spool shaped indicator 90 which as shown has a flange 91 which may bear against the adjacent face of the rod 89. This indicator 90 is shown as provided with a slot 92 at its central portion through which is visible a scale 93 marked on the rod 88, the marginal portion of the slot 92 being provided with an indicating mark 94. The handle portions 88 and 89 being in their normally separated condition and the member 90 slid toward the outer end, the threaded member is screwed into the opening 81, and when in position therein the rods 88 and 89 are brought together as far as permitted by engagement of the member 81 on the threaded member. The spool shaped member 90 is then moved away from the free end of the rod 88 as far as is permitted by the engagement of the flange by the rod 89, whereupon the index mark 94 indicates a point on the graduations 93. By comparing the position of this point when a standard threaded member is within the opening 81 and when a threaded member to be tested is within this opening, the pitch diameter of the member to be tested may be compared with that of the standard. Preferably the scale 93 is marked with a zero point where the mark 94 registers when a standard test piece is within the opening 91.

In Figure 23 a modification of this construction is shown in order that the scale over which the spool shaped indicator passes may be uniformly divided, equal increments corresponding to equal increments of pitch diameter. For this purpose the arm 100 against which the indicator flange 91 bears is curved as shown in Figure 23, this curve being so laid out that equal distances along the scale on the straight arm 101, when the arm 100 engages the spool shaped member, represent equal changes of pitch diameter of work within the opening 81.

Having thus described certain embodiments of this invention it should be evident that various changes and modifications might be made therein without departing from its spirit or scope as defined by the appended claims.

I claim:

1. A thread gauge comprising a wrapping element circumferentially engageable between the adjacent threads of a threaded member, and means connected to spaced portions of and controlled by said element for indicating variations in pitch diameter of the threads to be tested from standard threads by differences in angular extent of engagement of said element when wrapped about a standard threaded member and when wrapped about a threaded member to be tested.

2. A thread gauge comprising a coil of resilient material which may be sprung between adjacent threads of a threaded member, and magnifying means connected to spaced portions of said coil for indicating the angular extent of engagement thereon of the length of said coil between said spaced portions when applied to the threaded member.

3. The method of testing the pitch diameter of a threaded member which comprises engaging a wrapping element of definite length circumferentially between adjacent threads of a standard threaded member and then between adjacent threads of the member to be tested, and noting the differences in angular extent of said element when engaged with the standard member and when engaged with the member to be tested.

4. A method of gauging screw threads which comprises engaging and seating a flexible member of predetermined length in the spaces between the threads, and noting departures in the average diameter of the turns of said member when so engaged from their average diameter when said member is engaged in the spaces between standard threads of the same nominal dimensions.

5. The method of gauging screw threads which comprises wrapping a definite length of flexible material about the threads in the spaces therebetween, and measuring the angular extent of wrapping engagement of said length.

6. A thread gauge comprising a pair of elements having threaded engagement with each other by threads of the same lead as the threaded member to be tested, a coil of resilient material fixed at opposite ends to said elements and engageable between adjacent threads of the threaded member to be tested, and means for indicating the relative angular positions of said elements when said coil is in wrapping engagement with the threaded member in the spaces between its threads.

7. A thread gauge comprising a flexible helix the turns of which are adapted to be seated in the thread spaces of a screw to be gauged and wrapped into engagement with the opposed walls of said spaces by relatively moving the opposite ends of the helix about the axis thereof, and mutually cooperative means secured to the respective ends of said helix for indicating the average diameter of the helix when so wrapped.

8. A thread gauge comprising a flexible helix the turns of which are adapted to be seated in the thread spaces of a screw to be gauged and wrapped into engagement with the opposed walls of said spaces by relatively moving the opposite ends of said helix about the axis thereof, and means secured to the respective ends of a definite length of said helix and responsive to the angular extent of engagement of said length on said screw for indicating the average pitch diameter of the screw throughout the portion engaged.

In testimony whereof I have affixed my signature.

JAMES HARTNESS.